United States Patent
Wu et al.

(10) Patent No.: US 12,412,476 B2
(45) Date of Patent: Sep. 9, 2025

(54) VEHICLE-ROAD COLLABORATIVE LANE-CHANGING RISK ASSESSMENT METHOD BASED ON COORDINATE TRANSFORMATION

(71) Applicants: NANJING UNIVERSITY OF AERONAUTICS AND ASTRONAUTICS, Jiangsu (CN); NANJING PANDA ELECTRONICS CO., LTD., Jiangsu (CN)

(72) Inventors: Honglan Wu, Jiangsu (CN); Yue Zhang, Jiangsu (CN); Xuzhou Guo, Jiangsu (CN); Youchao Sun, Jiangsu (CN)

(73) Assignees: NANJING UNIVERSITY OF AERONAUTICS AND ASTRONAUTICS, Jiangsu (CN); NANJING PANDA ELECTRONICS CO., LTD., Jiangsu (CN)

( * ) Notice: Subject to any disclaimer, the term of this patent is extended or adjusted under 35 U.S.C. 154(b) by 0 days.

(21) Appl. No.: 19/075,794

(22) Filed: Mar. 11, 2025

(65) Prior Publication Data
US 2025/0209918 A1    Jun. 26, 2025

Related U.S. Application Data

(63) Continuation of application No. PCT/CN2024/103767, filed on Jul. 5, 2024.

(30) Foreign Application Priority Data

Aug. 28, 2023    (CN) .......................... 202311087462.7

(51) Int. Cl.
G08G 1/16    (2006.01)

(52) U.S. Cl.
CPC ............. *G08G 1/167* (2013.01); *G08G 1/166* (2013.01)

(58) Field of Classification Search
CPC .............................. G08G 1/167; G08G 1/166
See application file for complete search history.

(56) References Cited

U.S. PATENT DOCUMENTS

2010/0228419 A1    9/2010 Lee et al.

FOREIGN PATENT DOCUMENTS

| CN | 110085056 | 8/2019 |
|---|---|---|
| CN | 113602265 | 11/2021 |

(Continued)

OTHER PUBLICATIONS

Machine Translation of CN110085056A (see attached PDF version) (Year: 2019).*

(Continued)

*Primary Examiner* — Michael V Kerrigan
(74) *Attorney, Agent, or Firm* — JCIPRNET

(57) ABSTRACT

Disclosed is a vehicle-road collaborative lane-changing risk assessment method based on a coordinate transformation, including: parsing vehicle marshaling information of a vehicle-road collaborative platform to obtain driving data of involved vehicles; determining a two-dimensional coordinate system that takes a lane-changing vehicle as a center point; converting a geographic coordinate system into a spatial coordinate system, and mapping the same into the two-dimensional coordinate system to complete the transformation from the geographic coordinate system to a real-time plane coordinate system; establishing a risk assessment model; inputting driving data and expected values of the involved vehicles during the lane changing into the risk assessment model for computational analysis and simulation; and exploring an influence of the driving data on a (Continued)

lane-changing risk to identify a factor that has a greatest influence on the lane-changing risk.

12 Claims, 3 Drawing Sheets

(56)   References Cited

FOREIGN PATENT DOCUMENTS

| | | |
|---|---|---|
| CN | 113844444 | 12/2021 |
| CN | 115009274 | 9/2022 |
| CN | 117334082 | 1/2024 |

OTHER PUBLICATIONS

"International Search Report (Form PCT/ISA/210) of PCT/CN2024/103767," mailed on Aug. 16, 2024, with English translation thereof, pp. 1-6.

"Written Opinion of the International Searching Authority (Form PCT/ISA/237) of PCT/CN2024/103767," mailed on Aug. 16, 2024, pp. 1-4.

* cited by examiner

VEHICLE-ROAD COLLABORATIVE LANE-CHANGING RISK ASSESSMENT METHOD BASED ON COORDINATE TRANSFORMATION

CROSS-REFERENCE TO RELATED APPLICATION

This application is a continuation of international application of PCT application serial no. PCT/CN2024/103767 filed on Jul. 5, 2024, which claims the priority benefit of China application no. 202311087462.7 filed on Aug. 28, 2023. The entirety of each of the above mentioned patent applications is hereby incorporated by reference herein and made a part of this specification.

TECHNICAL FIELD

The present disclosure belongs to the field of risk assessment of vehicle-road cooperative systems, and particularly relates to a vehicle-road collaborative lane-changing risk assessment method based on a coordinate transformation.

BACKGROUND

With the development of vehicle-road collaboration technology, breakthroughs and popularization of vehicle intelligent networking technology, a risk of collision caused by lane-changing behavior during driving has gradually become a research focus. However, due to complex and various factors such as vehicle driving environment, road type, and road conditions, no unified method is available for assessing a lane-changing risk. In previous studies, although the assessment methods varied, assessment models thereof were established based on data that could be collected by a lane-changing vehicle itself as assessment parameters, therefore, driving intentions of surrounding vehicles cannot be accurately identified, and the conclusions drawn therefrom were mostly qualitative. In addition, human factors also have an influence, for example, subjective and random driving behavior of a driver could result in significant differences in some assessment parameters, leading to invalid parameters and ultimately causing significant deviations in assessment results.

Existing research results have not yet shown any related results that make use of a vehicle-road collaborative platform to organize vehicle information into vehicle platoon, nor adopt a unified method to assess the lane-changing risk, and analyze influencing factors that cause a risk. Therefore, a new technical solution is needed to solve the above problems.

SUMMARY

Objective of the present disclosure: in order to overcome the deficiencies of the vehicle lane-changing risk assessment model in the prior art, the present disclosure provides a vehicle-road collaborative lane-changing risk assessment method based on a coordinate transformation. By transforming and mapping the geographic coordinate system of the vehicle, a two-dimensional coordinate transformation is unified, and a risk assessment model is established to analyze lane-changing risk influencing factors of the vehicle, thereby ensuring the safety and effectiveness of the vehicle during lane changing, and providing a new idea for logic determination and path planning of lane changing.

Technical solution: in order to implement the above objective, the present disclosure provides a vehicle-road collaborative lane-changing risk assessment method based on a coordinate transformation, including the following steps:

S1: receiving and prasing vehicle-road collaborative vehicle marshaling information by a lane-changing vehicle to obtain driving data of involved vehicles;

S2: determining a two-dimensional coordinate system that takes the lane-changing vehicle as a center point;

S3: converting a geographic coordinate system of the involved vehicles obtained in the step S1 into a spatial coordinate system and mapping the same into the two-dimensional coordinate system established in the step S2, and completing the transformation from the geographic coordinate system to the two-dimensional coordinate system;

S4: building a vehicle lane-changing risk assessment model based on the two-dimensional coordinate system established in the step S3;

S5: inputting driving parameters of the involved vehicles parsed and obtained in the step S1 into the risk assessment model built in the step S4, and performing computational simulation;

S6: altering the driving data of any of the vehicles while keeping other parameters unchanged, further performing computational simulation, and analyzing an influence of an individual parameter on the lane-changing risk; and S7: comparing results of the computational simulation to identify a factor that has a greatest influence on the lane-changing risk.

Further, in the step S1, the vehicle marshaling information is a real-time driving dataset of a group of vehicles, which is denoted as D, and the vehicle information is denoted as C, then $D=[C_1, C_2, C_3, \ldots, C_n]$.

The vehicle information $C_i = \{p_i, v_i, a_i, r_i, \Delta p_b, \theta_i \ldots\}$, where $p_i = (L_i, B_i, H_i)$ is real-time geographic coordinate information of Vehicle i ($L_i$ is a longitude, $B_i$ is a latitude, and $H_i$ is an altitude), $v_i$ is a driving speed of Vehicle i, $a_i$ is a driving acceleration of Vehicle i, $r_i$ is a lane of Vehicle i, $\Delta p_b = (\Delta L_b, \Delta B_b, \Delta H_b)$ is position correction information of a positioning reference station, and $\theta_i$ is a steering angle of Vehicle i.

Further, in the step S2, a two-dimensional coordinate system that takes a lane-changing vehicle $P_0$ as a center point is established, where a true north is identified as a positive direction of a Y axis, a true east is identified as a positive direction of an X axis, which is consistent with a direction of the Earth's spatial coordinate system, facilitating subsequent translation and transformation of the geographic coordinate system.

Further, in the step S3, the vehicle geographic coordinate point information parsed and obtained in the step S1 is converted into the two-dimensional coordinate system using the positioning reference station to mitigate positioning errors, thereby converting into the two-dimensional coordinate system, and completing the mapping of a vehicle point position to the two-dimensional coordinate system. Specific transformation process is as follows:

A1: correcting the latitude and longitude of the vehicle in a unified manner according to standard errors in latitude and longitude of the positioning reference station to reduce error interference, and obtaining actual coordinates $p'_i(L'_i, B'_i, H'_i)$.

$$\begin{cases} L'_i = L_i - \Delta L_b \\ B'_i = B_i - \Delta B_b \\ H'_i = H_i - \Delta H_b \end{cases}$$

Since a relative distance between the lane-changing vehicle and a marshaled vehicle at a same moment is small, elevation information of the road segment they are located does not change greatly, an influence of elevation information on lane-changing risk is ignored in the subsequent coordinate transformation process, and $L'_i$ and $B'_i$ are only used to conduct the calculation.

A2: calculating a distance $l_{i0}$ between a vehicle of the vehicle marshaling and the lane-changing vehicle $p'_0(L'_0, B'_0, H'_0)$, respectively, according to the corrected latitude and longitude information of the vehicle $p'_i$.

$$l_{i0} = 2*R*\sin^{-1}\left(\sqrt{\left(\sin\frac{PI(B'_i - B'_0)}{360}\right)^2 + \cos\frac{PI*B'_i}{180}\cos\frac{PI*B'_0}{180}\left(\sin\frac{PI(L'_i - L'_0)}{360}\right)^2}\right)$$

where $l_{i0}$ is a distance between Vehicle i and the lane-changing vehicle, R is a radius of the Earth, and PI is a circumference ratio.

A3: translating coordinates of a center of the Earth to a center of the lane-changing vehicle, keeping directions of X axis and Y axis unchanged, ignoring a Z axis and projecting coordinates of the involved vehicles onto the two-dimensional coordinate system to obtain the transformed coordinates of the involved vehicles $A_i(A_{ix}, A_{iy})$.

$$\begin{cases} A_{ix} = l_{i0}\cos L'_i \\ A_{iy} = l_{i0}\sin L'_i \end{cases}$$

Further, in the step S4, the two-dimensional coordinate system established in the step S3 to build the vehicle lane-changing risk assessment model RI, $RI=(R_l, R_r)$, where $R_l$ and $R_r$ represent risk indicators of changing lanes to left and right, respectively, $R_l, R_r = \text{Max}(RI_x, RI_y)$, where $RI_x$ is a lateral (vehicle spacing in an X-axis direction during lane changing) lane-changing risk, and $RI_y$ is a longitudinal (vehicle spacing in a Y-axis direction during lane changing) lane-changing risk. Specific steps for model building are as follows:

B1: calculating a coordinate position of the vehicle after $\Delta T$ according to instantaneous driving parameters of the vehicle, where $\Delta T$ is expected lane-changing time; since $\Delta T$ is short, a uniform acceleration motion formula $$s = vt + \frac{1}{2}at^2$$

is used to calculate and obtain coordinates after motion, that is, $A'_i(A'_{ix}, A'_{iy})$.

$$\begin{cases} A'_{ix} = A_{ix} + \left(v_i\Delta T + \frac{1}{2}a_i\Delta T^2\right)\cos\theta_i \\ A'_{iy} = A_{iy} + \left(v_i\Delta T + \frac{1}{2}a_i\Delta T^2\right)\sin\theta_i \end{cases}$$

B2: calculating a lateral distance between Vehicle i and the lane-changing vehicle $$|A'_{0x} - A'_{ix}| = \left|\left(v_0\Delta T + \frac{1}{2}a_0\Delta T^2\right)\cos\theta_0 - A_{ix} - \left(v_i\Delta T + \frac{1}{2}a_i\Delta T^2\right)\cos\theta_i\right|.$$

B3: establishing a $RI_x$ lateral lane-changing risk model, with an expression as follows:

$$RI_x = \begin{cases} 1 - \prod_{i=0}^{N}\left(1 - \frac{S_x}{|A'_{0x} - A'_{ix}|}\right), & |A'_{0x} - A'_{ix}| > S_x \\ 1, & |A'_{0x} - A'_{ix}| \leq S_x \end{cases}$$

where $A'_{0x}$ is an X-axis coordinate of the lane-changing vehicle after $\Delta T$, $A'_{ix}$ is an X-axis coordinate of an involved vehicle i, $|A'_{0x}-A'_{ix}|$ is a lateral distance between two vehicles, and $S_x$ is a desired minimum lateral lane-changing distance.

B4: Similarly, establishing a $RI_y$ longitudinal lane-changing risk model, with an expression as follows:

$$RI_y = \begin{cases} 1 - \prod_{i=0}^{N}\left(1 - \frac{S_y}{|A'_{0y} - A'_{iy}|}\right), & |A'_{0y} - A'_{iy}| > S_y \\ 1, & |A'_{0y} - A'_{iy}| \leq S_y \end{cases}$$

where $A'_{0y}$ is a Y-axis coordinate of the lane-changing vehicle after $\Delta T$, $A'_{iy}$ is a Y-axis coordinate of the involved vehicle i, $|A'_{0y}-A'_{iy}|$ is a longitudinal distance between two vehicles, and $S_y$ is a desired minimum longitudinal lane-changing distance.

When the lane-changing vehicle changes lanes to the left, $R_l=\text{Max}(RI_x, RI_y)$; when $R_l \geq RI_0$, $RI_0$ is a critical risk value, in which case, a collision during lane changing will definitely happen; and when $R_l < RI_0$, lane changing can be made, in which case, a probability of collision caused by lane changing is relatively low.

$S_x$ and $S_y$ are both preset values, that is, a safe lane-changing distance.

B5: grouping the involved vehicles by lane according to the vehicle marshaling data parsed and obtained in the step S1, and calculating the risk indicators of changing lanes to left and right, respectively according to the established risk assessment model.

Further, in the step S5, the parsed and obtained driving parameters of the involved vehicles are inputted into the risk assessment model built in the step S4, and computational simulation is performed to obtain the risk of lane changing under various complex conditions, and factors with the most critical influence are then identified.

In order to quantify a risk level of the vehicle during the lane changing, the present disclosure introduces a lane-changing risk indicator RI, and establishes a vehicle-road collaborative lane-changing risk assessment method based on a coordinate transformation. The method obtains and parses the vehicle marshaling information of the vehicle-road collaborative platform by linking with the vehicle-road collaborative platform, performs correction calculation of geographic coordinates of the vehicle, and maps the geographic coordinates into the two-dimensional coordinate system to complete the conversion of coordinate system. In addition, the risk assessment model is established, the vehicle marshaling information is taken as input parameters to carry out simulation experiments, and a factor that has a greatest influence on the lane-changing risk identified, ensuring the safety of the vehicle during driving.

Beneficial effects: compared with the prior art, the present disclosure combines precise data from the vehicle-road collaborative platform and uses coordinate transformation to establish a unified two-dimensional coordinate system. A risk assessment model is built for simulation, the simulation objects are not only the lane-changing vehicle, but also the vehicles in the entire vehicle marshaling, making the results more accurate and reliable, upon which the lane-changing risk of the left and right lanes, as well as longitudinal and lateral lanes, can be determined. Therefore, the method is applicable to various road environments, ensuring the safety of lane changing and improving the efficiency of lane changing.

DESCRIPTION OF THE EMBODIMENTS

The present disclosure will be further described below in conjunction with accompanying drawings and specific embodiments. It should be understood that these embodiments are only intended to illustrate the present disclosure but not to limit the scope of the present disclosure. Various modifications in equivalent forms made by those skilled in the art after reading through the present disclosure should fall within the scope defined by the appended claims of the present disclosure.

Figure 1:
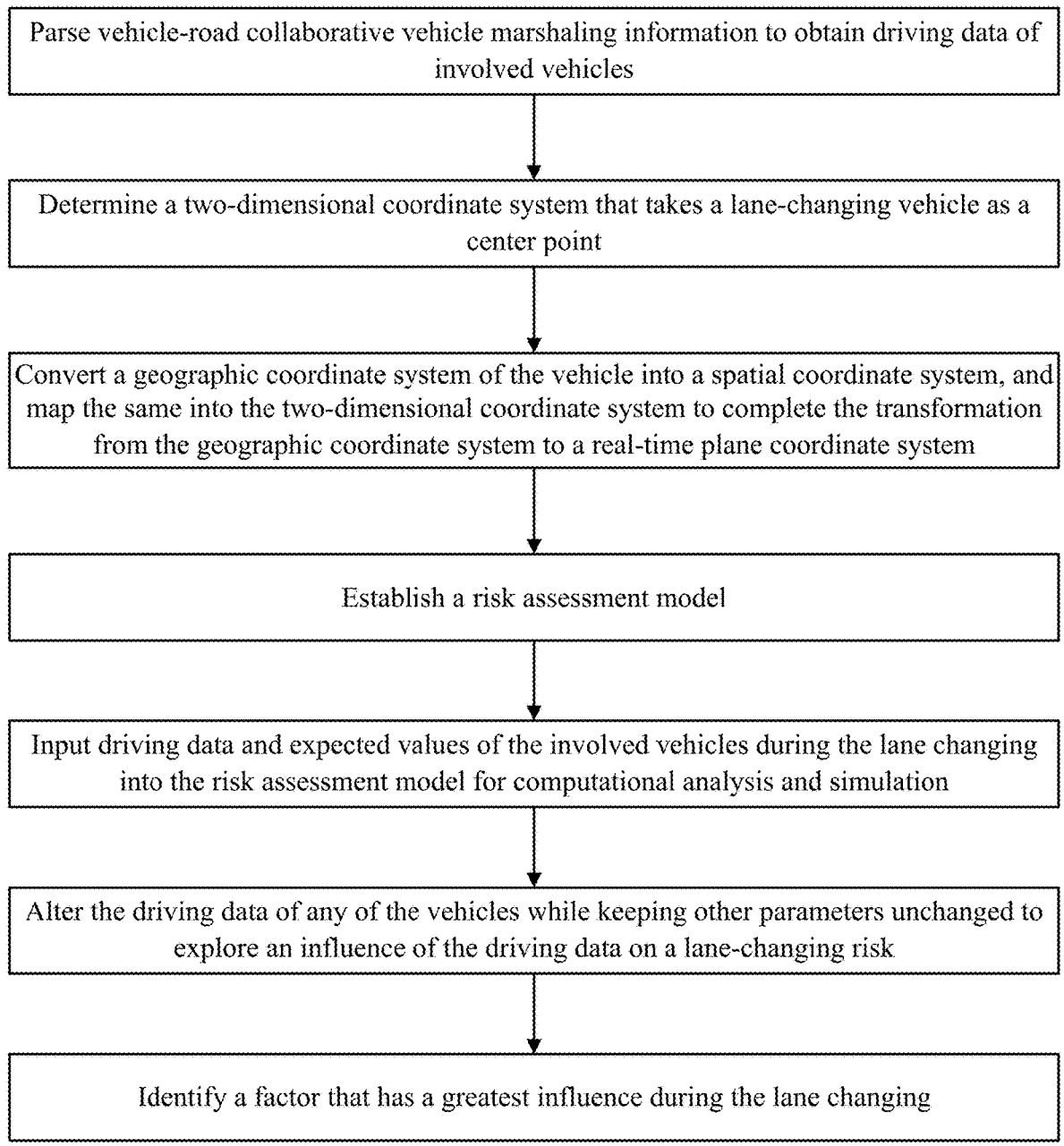
FIG. 1 is a schematic flowchart of a method according to the present disclosure.

The present disclosure provides a vehicle-road collaborative lane-changing risk assessment method based on a coordinate transformation, as shown in FIG. 1, including the following steps:

S1: receiving and prasing vehicle-road collaborative vehicle marshaling information by a lane-changing vehicle to obtain driving data of involved vehicles;

S2: determining a two-dimensional coordinate system that takes the lane-changing vehicle as a center point;

S3: converting a geographic coordinate system of the involved vehicles obtained in the step S1 into a spatial coordinate system and mapping the same into the two-dimensional coordinate system established in the step S2, and completing the transformation from the geographic coordinate system to the two-dimensional coordinate system;

S4: building a vehicle lane-changing risk assessment model based on the two-dimensional coordinate system established in the step S3;

S5: inputting driving parameters of the involved vehicles parsed and obtained in the step S1 into the risk assessment model built in the step S4, and performing computational simulation;

S6: altering the driving data of any of the vehicles while keeping other parameters unchanged, further performing computational simulation, and analyzing an influence of an individual parameter on the lane-changing risk; and S7: comparing results of the computational simulation to identify a factor that has a greatest influence on the lane-changing risk.

Figure 2:
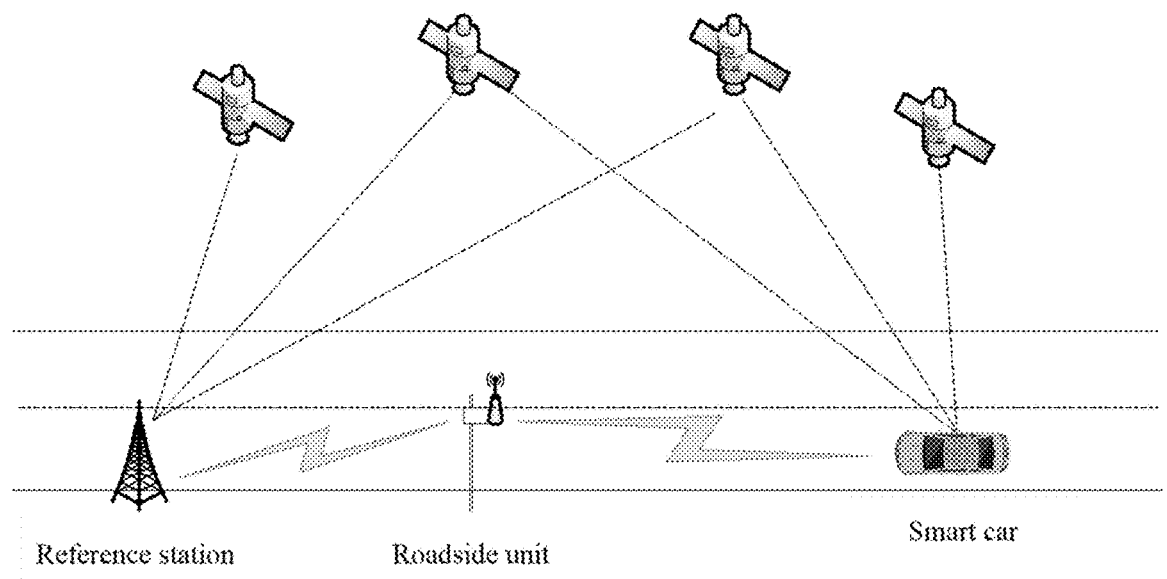
FIG. 2 is a diagram of a vehicle marshaling information receiving process by a vehicle-road cooperative platform according to the present disclosure.

As shown in FIG. 2, in the step S1, the vehicle marshaling information is a real-time driving dataset of a group of vehicles, which is denoted as D, and the vehicle information is denoted as C, then $D=[C_1, C_2, C_3, \ldots, C_n]$.

The vehicle information $C_i=\{p_i, v_i, a_i, r_i, \Delta p_b, \theta_i \ldots \}$, where $p_i=(L_i, B_i, H_i)$ is real-time geographic coordinate information of Vehicle i ($L_i$ is a longitude, $B_i$ is a latitude, and $H_i$ is an altitude), $v_i$ is a driving speed of Vehicle i, $a_i$ is a driving acceleration of Vehicle i, $r_i$ is a lane of Vehicle i, $\Delta p_b=(\Delta L_b, \Delta B_b, \Delta H_b)$ is position correction information of a positioning reference station, and $\theta_i$ is a steering angle of Vehicle i.

In the step S2, a two-dimensional coordinate system that takes a lane-changing vehicle $P_0$ as a center point is established, where a true north is identified as a positive direction of a Y axis, a true east is identified as a positive direction of an X axis, which is consistent with a direction of the Earth's spatial coordinate system, facilitating subsequent translation transformation of the geographic coordinate system.

In the step S3, the vehicle geographic coordinate point information parsed and obtained in the step S1 is converted into the two-dimensional coordinate system using the positioning reference station to mitigate positioning errors, thereby converting into the two-dimensional coordinate system, and completing the mapping of a vehicle point position to the two-dimensional coordinate system. Specific transformation process is as follows:

A1: correcting the latitude and longitude of the vehicle in a unified manner according to standard errors in latitude and longitude of the positioning reference station to reduce error interference, and obtaining actual coordinates $p'_i((L'_i, B'_i, H'_i)$.

$$\begin{cases} L'_i = L_i - \Delta L_b \\ B'_i = B_i - \Delta B_b \\ H'_i = H_i - \Delta H_b \end{cases}$$

Since a relative distance between the lane-changing vehicle and a marshaled vehicle at a same moment is small, elevation information of the road segment that the lane-changing vehicle is located does not change greatly, an influence of elevation information on lane-changing risk is ignored in the subsequent coordinate transformation process, and $L'_i$ and $B'_i$ are only used to conduct the calculation.

A2: calculating a distance $l_{i0}$ between a vehicle of the vehicle marshaling and the lane-changing vehicle $p'_0(L'_0, B'_0, H'_0)$, respectively, according to the corrected latitude and longitude information of the vehicle $p'_i$.

$$l_{i0} = 2 * R *$$
$$\sin^{-1}\left(\sqrt{\left(\sin\frac{PI(B'_i - B'_0)}{360}\right)^2 + \cos\frac{PI*B'_i}{180}\cos\frac{PI*B'_0}{180} + \left(\sin\frac{PI(L'_i - L'_0)}{360}\right)^2}\right)$$

where $l_{i0}$ is a distance between Vehicle i and the lane-changing vehicle, R is a radius of the Earth, and PI is a circumference ratio.

A3: translating coordinates of a center of the Earth to a center of the lane-changing vehicle, keeping directions of X axis and Y axis unchanged, ignoring a Z axis, and projecting coordinates of the involved vehicles onto the two-dimensional coordinate system to obtain the transformed coordinates of the involved vehicles $A_i(A_{ix}, A_{iy})$.

$$\begin{cases} A_{ix} = l_{i0}\cos L'_i \\ A_{iy} = l_{i0}\sin L'_i \end{cases}$$

In the step S4, the two-dimensional coordinate system established in the step S3 to build the vehicle lane-changing risk assessment model RI, RI=$(R_l, R_r)$, where $R_l$ and $R_r$ represent risk indicators of changing lanes to left and right, respectively, $R_l$, $R_r$=Max($RI_x$, $RI_y$), where $RI_x$ is a lateral (vehicle spacing in an X-axis direction during lane changing) lane-changing risk, and $RI_y$ is a longitudinal (vehicle spacing in a Y-axis direction during lane changing) lane-changing risk. Specific steps for model building are as follows:

B1: calculating a coordinate position of the vehicle after $\Delta T$ according to instantaneous driving parameters of the vehicle, where $\Delta T$ is expected lane-changing time; since $\Delta T$ is short, a uniform acceleration motion formula $$s = vt + \frac{1}{2}at^2$$

is used to calculate and obtain coordinates after motion, that is, $A'_i(A'_{ix}, A'_{iy})$.

$$\begin{cases} A'_{ix} = A_{ix} + \left(v_i\Delta T + \frac{1}{2}a_i\Delta T^2\right)\cos\theta_i \\ A'_{iy} = A_{iy} + \left(v_i\Delta T + \frac{1}{2}a_i\Delta T^2\right)\sin\theta_i \end{cases}$$

B2: calculating a lateral distance between Vehicle i and the lane-changing vehicle $$|A'_{0x} - A'_{ix}| = \left|\left(v_0\Delta T + \frac{1}{2}a_0\Delta T^2\right)\cos\theta_0 - A_{ix} - \left(v_i\Delta T + \frac{1}{2}a_i\Delta T^2\right)\cos\theta_i\right|.$$

B3: establishing a $RI_x$ lateral lane-changing risk model, with an expression as follows:

$$RI_x = \begin{cases} 1 - \prod_{i=0}^{N}\left(1 - \frac{S_x}{|A'_{0x} - A'_{ix}|}\right), & |A'_{0x} - A'_{ix}| > S_x \\ 1, & |A'_{0x} - A'_{ix}| \leq S_x \end{cases}$$

where $A'_{0x}$ is an X-axis coordinate of the lane-changing vehicle after $\Delta T$, $A'_{ix}$ is an X-axis coordinate of an involved vehicle i, $|A'_{0x}-A'_{ix}|$ is a lateral distance between two vehicles, and $S_x$ is a desired minimum lateral lane-changing distance.

B4: similarly, establishing a $RI_y$ longitudinal lane-changing risk model, with an expression as follows:

$$RI_y = \begin{cases} 1 - \prod_{i=0}^{N}\left(1 - \frac{S_y}{|A'_{0y} - A'_{iy}|}\right), & |A'_{0y} - A'_{iy}| > S_y \\ 1, & |A'_{0y} - A'_{iy}| \leq S_y \end{cases}$$

where $A'_{0y}$ is a Y-axis coordinate of the lane-changing vehicle after $\Delta T$, $A'_{iy}$ is a Y-axis coordinate of the involved vehicle i, $|A'_{0y}-A'_{iy}|$ is a longitudinal distance between two vehicles, and $S_y$ is a desired minimum longitudinal lane-changing distance.

When the lane-changing vehicle changes lanes to the left, $R_l$=Max($RI_x$, $RI_y$); when $R_l \geq RI_0$, $RI_0$ is a critical risk value, in which case, a collision during lane changing will definitely happen; and when $R_l < RI_0$, lane changing can be made, in which case, a probability of collision caused by lane changing is relatively low.

B5: grouping the involved vehicles by lane according to the vehicle marshaling data parsed and obtained in the step S1, and calculating the risk indicators of changing lanes to left and right, respectively according to the established risk assessment model.

In the step S5, the parsed and obtained driving parameters of the involved vehicles are inputted into the risk assessment model built in the step S4, and computational simulation is performed to obtain the risk of lane changing under various complex conditions, and factors with the most critical influence are then identified.

The present disclosure further provides a vehicle-road collaborative lane-changing risk assessment system based on a coordinate transformation, including a network interface, a memory, and a processor, where the network interface is configured for receiving and sending signals during information exchange with other external network elements in a process of sending and receiving information between other external network elements; the memory is configured for storing computer program instructions capable of being executed on the processor; and the processor is configured for performing the steps of the aforesaid method when the computer program instructions are ran.

The present disclosure further provides a computer storage medium having stored thereon computer program which, when being executed by a processor, implement the above method. The computer-readable medium can be considered tangible and non-transitory. Non-limiting examples of the non-transitory tangible computer-readable medium include non-volatile memory circuits (such as flash memory circuits, erasable programmable read-only memory circuits, or masked read-only memory circuits), volatile memory circuits (such as static random access memory circuits or dynamic random access memory circuits), magnetic storage media (such as analog or digital magnetic tapes or hard disk drives), and optical storage media (such as CDs, DVDs, or Blu-ray discs), and the like. The computer program includes processor-executable instructions stored on at least one non-transitory tangible computer-readable medium. The computer program may further include or rely on stored data. The computer program may include a basic input/output system (BIOS) that interacts with the hardware of a special-purpose computer, device drivers that interacts with specific devices of the special-purpose computer, one or more operating systems, user applications, background services, background applications, and the like.

Figure 3:
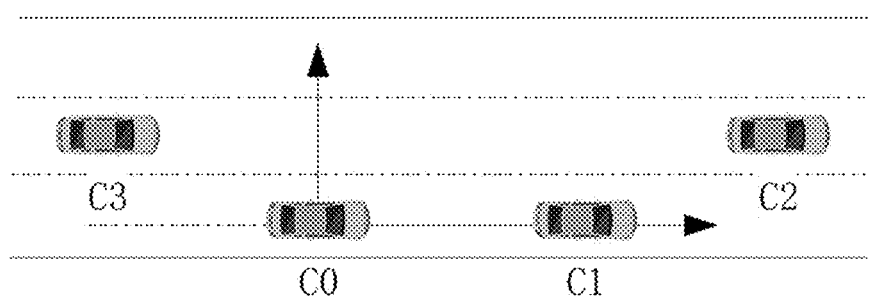
FIG. 3 is a schematic diagram of vehicle marshaling information according to the present disclosure.
Figure 6:
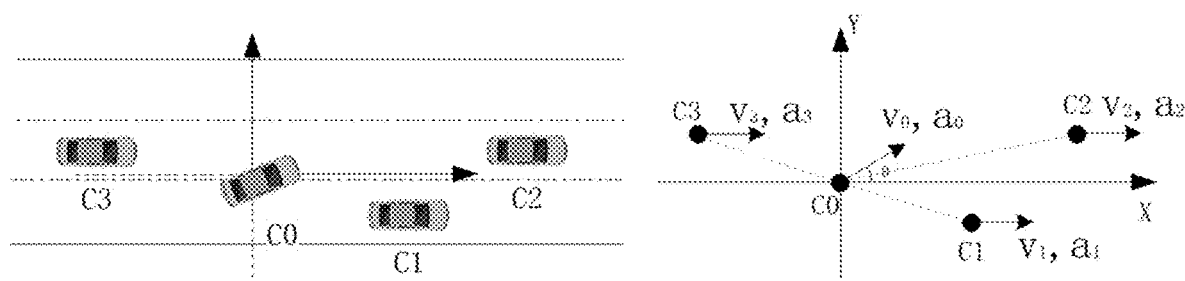
FIG. 6 is a diagram of a vehicle coordinate mapping relationship according to the present disclosure.

Based on the above content and in order to verify the effectiveness of the method in the present disclosure, the method is applied as follows:

as shown in FIG. 3, the vehicle marshaling information includes Vehicles C0-C3, with specific positions shown in the figure; and the specific implementation process is as follows:

1) receiving and prasing vehicle-road collaborative vehicle marshaling information by a lane-changing vehicle C0 to obtain driving data of involved vehicles (C1-C3);
2) determining a two-dimensional coordinate system that takes a lane-changing vehicle C0 as a center point;
3) with reference to FIG. 6, converting a geographic coordinate system of the involved vehicles obtained in the item 1) into a spatial coordinate system and mapping the same into the two-dimensional coordinate system established in the item 2), and completing the transformation from the geographic coordinate system to the two-dimensional coordinate system;
4) building a vehicle lane-changing risk assessment model based on the two-dimensional coordinate system established in the item 3);
5) inputting driving parameters of the involved vehicles parsed and obtained in the item 1) into the risk assessment model built in the item 4), and performing computational simulation;
6) altering the driving data of any of the vehicles while keeping other parameters unchanged, further performing computational simulation, and analyzing an influence of an individual parameter on the lane-changing risk; and
7) comparing results of the computational simulation to identify a factor that has a greatest influence on the lane-changing risk.

Figure 4:
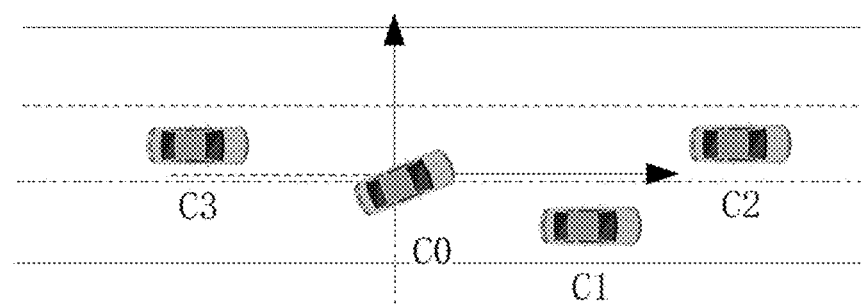
FIG. 4 is a schematic diagram of a vehicle lane-changing process according to the present disclosure.
Figure 5:
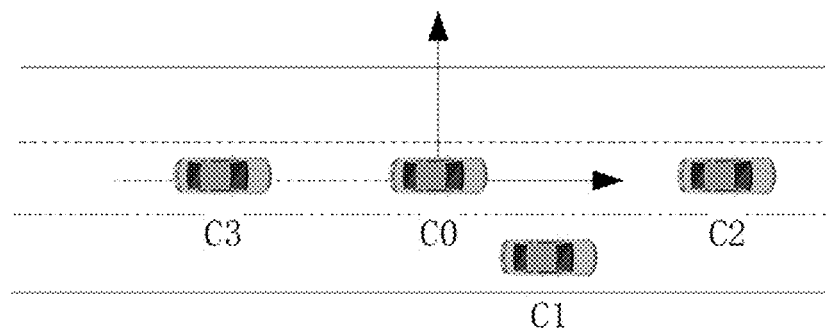
FIG. 5 is a schematic diagram of end of a vehicle lane-changing process according to the present disclosure.

The lane-changing vehicle C0 changes a lane according to the obtained lane-changing risk influencing factors, as shown in FIGS. 4 and 5.

The lane change risk influencing factors include driving speed, acceleration, steering angle of vehicles in the vehicle marshaling, as well as a relative distance between vehicles. Under the condition that motion states of other vehicles remain unchanged, the faster the lane-changing vehicle is, the smaller the steering angle becomes, the greater the acceleration is, and the higher the risk becomes.

What is claimed is:

1. A vehicle-road collaborative lane-changing risk assessment method based on a coordinate transformation, comprising the following steps:
   step S1: receiving and parsing vehicle-road collaborative vehicle marshaling information by a lane-changing vehicle to obtain driving data of involved vehicles;
   step S2: determining a two-dimensional coordinate system that takes the lane-changing vehicle as a center point;
   step S3: converting a geographic coordinate system of the involved vehicles obtained in the step S1 into a spatial coordinate system and mapping the same into the two-dimensional coordinate system established in the step S2, and completing a transformation process from the geographic coordinate system to the two-dimensional coordinate system;
   step S4: building a vehicle lane-changing risk assessment model based on the two-dimensional coordinate system established in the step S3;
   step S5: inputting driving parameters of the involved vehicles parsed and obtained in the step S1 into the risk assessment model built in the step S4, and performing a computational simulation;
   step S6: altering the driving data of any of the vehicles while keeping other parameters unchanged, further performing the computational simulation, and analyzing an influence of an individual parameter on the lane-changing risk; and
   step S7: comparing results of the computational simulation to identify a factor that has a greatest influence on the lane-changing risk.

2. The vehicle-road collaborative lane-changing risk assessment method based on the coordinate transformation according to claim 1, wherein in the step S1, the vehicle marshaling information is a real-time driving dataset of a group of vehicles, which is denoted as D, and vehicle information is denoted as C, then $D=[C_1, C_2, C_3, \ldots, C_n]$;
   the vehicle information $C_i=\{p_i, v_i, a_i, r_i, \Delta p_b, \theta_i \ldots \}$, wherein $p_i=(L_i, B_i, H_i)$ is real-time geographic coordinate information of Vehicle i; $L_i$ is a longitude, $B_i$ is a latitude, and $H_i$ is an altitude; $v_i$ is a driving speed of the Vehicle i, $a_i$ is a driving acceleration of the Vehicle i, $r_i$ is a lane of the Vehicle i, $\Delta p_b=(\Delta L_b, \Delta B_b, \Delta H_b)$ is position correction information of a positioning reference station, and $\theta_i$ is a steering angle of the Vehicle i.

3. The vehicle-road collaborative lane-changing risk assessment method based on the coordinate transformation according to claim 2, wherein in the step S3, vehicle geographic coordinate point information parsed and obtained in the step S1 is converted into the two-dimensional coordinate system using the positioning reference station to mitigate positioning errors, thereby converting into the two-dimensional coordinate system, and completing the mapping of a vehicle point position to the two-dimensional coordinate system; and
   wherein the transformation process is as follows:
   A1: correcting the latitude and longitude of the vehicle in a unified manner according to standard errors in latitude and longitude of the positioning reference station, and obtaining actual coordinates $p'_i(L'_i, B'_i, H'_i)$;

$$\begin{cases} L'_i = L_i - \Delta L_b \\ B'_i = B_i - \Delta B_b \\ H'_i = H_i - \Delta H_b \end{cases}$$

wherein an influence of elevation information on lane-changing risk is ignored in a subsequent coordinate transformation process, and $L'_i$ and $B'_i$ are only used to conduct calculation of actual coordinates;
   A2: calculating a distance $l_{i0}$ between a vehicle of the vehicle marshaling and the lane-changing vehicle $p'_0$ $(L'_0, B'_0, H'_0)$, respectively, according to the corrected latitude and longitude information of the vehicle $p'_i$; wherein $$l_{i0} = 2*R* \sin^{-1}\left(\sqrt{\left(\sin\frac{PI(B'_i - B'_0)}{360}\right)^2 + \cos\frac{PI*B'_i}{180}\cos\frac{PI*B'_0}{180} + \left(\sin\frac{PI(L'_i - L'_0)}{360}\right)^2}\right)$$

where $l_{i0}$ is a distance between the Vehicle i and the lane-changing vehicle, R is a radius of the Earth, and PI is a circumference ratio; and
   A3: translating coordinates of a center of the Earth to a center of the lane-changing vehicle, keeping directions of an X axis and a Y axis unchanged, ignoring a Z axis, and projecting coordinates of the involved vehicles onto the two-dimensional coordinate system to obtain the transformed coordinates of the involved vehicles $A_i(A_{ix}, A_{iy})$:

$$\begin{cases} A_{ix} = l_{i0} \cos L'_i \\ A_{iy} = l_{i0} \sin L'_i \end{cases}.$$

4. The vehicle-road collaborative lane-changing risk assessment method based on the coordinate transformation according to claim 3, wherein in the step S4, the two-dimensional coordinate system established in the step S3 to build the vehicle lane-changing risk assessment model RI, $RI=(R_l, R_r)$, where $R_l$ and $R_r$ represent risk indicators of changing lanes to left and right, respectively; $R_l$, $R_r$=Max $(RI_x, RI_y)$, where $RI_x$ is a lateral (vehicle spacing in an X-axis direction during lane changing) lane-changing risk, and $RI_y$ is a longitudinal (vehicle spacing in a Y-axis direction during lane changing) lane-changing risk.

5. The vehicle-road collaborative lane-changing risk assessment method based on the coordinate transformation according to claim 4, wherein in the step S4, a coordinate position of the vehicle after $\Delta T$ is calculated according to instantaneous driving parameters of the vehicle, where $\Delta T$ is expected lane-changing time; a uniform acceleration motion formula $$s = vt + \frac{1}{2}at^2$$

is used to calculate and obtain coordinates after motion, that is, $A'_i(A'_{ix}, A'_{iy})$:

$$\begin{cases} A'_{ix} = A_{ix} + \left(v_i \Delta T + \frac{1}{2}a_i \Delta T^2\right) \cos \theta_i \\ A'_{iy} = A_{iy} + \left(v_i \Delta T + \frac{1}{2}a_i \Delta T^2\right) \sin \theta_i \end{cases}.$$

6. The vehicle-road collaborative lane-changing risk assessment method based on the coordinate transformation according to claim 5, wherein in the step S4, a $RI_x$ lateral lane-changing risk model is established, with an expression as follows:

$$RI_x = \begin{cases} 1 - \prod_{i=0}^{N}\left(1 - \frac{S_x}{|A'_{0x} - A'_{ix}|}\right), & |A'_{0x} - A'_{ix}| > S_x \\ 1, & |A'_{0x} - A'_{ix}| \le S_x \end{cases}$$

where $A'_{0x}$ is an X-axis coordinate of the lane-changing vehicle after $\Delta T$, $A'_{ix}$ is an X-axis coordinate of an involved vehicle i, $|A'_{0x}-A'_{ix}|$ is a lateral distance between the two vehicles, and $S_x$ is a desired minimum lateral lane-changing distance.

7. The vehicle-road collaborative lane-changing risk assessment method based on the coordinate transformation according to claim 6, wherein in the step S4, a lateral distance between the Vehicle i and the lane-changing vehicle, $A_i$, is calculated as $$|A'_{0x} - A'_{ix}| = \left|\left(v_0 \Delta T + \frac{1}{2}a_0 \Delta T^2\right)\cos \theta_0 - A_{ix} - \left(v_i \Delta T + \frac{1}{2}a_i \Delta T^2\right)\cos \theta_i\right|$$

8. The vehicle-road collaborative lane-changing risk assessment method based on the coordinate transformation according to claim 7, wherein in the step S4, the involved vehicles are grouped by lane according to vehicle marshaling data parsed and obtained in the step S1, and risk indicators of changing lanes to left and right are calculated, respectively, according to the vehicle lane-changing risk assessment model; and when the lane-changing vehicle changes lanes to the left, $R_l$=Max($RI_x$, $RI_y$); when $R_l \ge RI_0$, $RI_0$ is a critical risk value, in which case, a collision during lane changing will definitely happen; and when $R_l < RI_0$, lane changing can be made, in which case, a probability of the collision caused by lane changing is relatively low.

9. The vehicle-road collaborative lane-changing risk assessment method based on the coordinate transformation according to claim 6, wherein in the step S4, the involved vehicles are grouped by lane according to vehicle marshaling data parsed and obtained in the step S1, and risk indicators of changing lanes to left and right are calculated, respectively, according to the vehicle lane-changing risk assessment model; and when the lane-changing vehicle changes lanes to the left, $R_l$=Max($RI_x$, $RI_y$); when $R_l \ge RI_0$, $RI_0$ is a critical risk value, in which case, a collision during lane changing will definitely happen; and when $R_l < RI_0$, lane changing can be made, in which case, a probability of the collision caused by lane changing is relatively low.

10. The vehicle-road collaborative lane-changing risk assessment method based on the coordinate transformation according to claim 5, wherein in the step S4, a $RI_y$ longitudinal lane-changing risk model is established, with an expression as follows:

$$RI_y = \begin{cases} 1 - \prod_{i=0}^{N}\left(1 - \frac{S_y}{|A'_{0y} - A'_{iy}|}\right), & |A'_{0y} - A'_{iy}| > S_y \\ 1, & |A'_{0y} - A'_{iy}| \le S_y \end{cases}$$

where, $A'_{0y}$ is a Y-axis coordinate of the lane-changing vehicle after $\Delta T$, $A'_{iy}$ is a Y-axis coordinate of the involved vehicle i, $|A'_{0y}-A'_{iy}|$ is a longitudinal distance between the two vehicles, and $S_y$ is a desired minimum longitudinal lane-changing distance.

11. The vehicle-road collaborative lane-changing risk assessment method based on the coordinate transformation according to claim 10, wherein in the step S4, the involved vehicles are grouped by lane according to vehicle marshaling data parsed and obtained in the step S1, and risk indicators of changing lanes to left and right are calculated, respectively, according to the vehicle lane-changing risk assessment model; and when the lane-changing vehicle changes lanes to the left, $R_l$=Max($RI_x$, $RI_y$); when $R_l \ge RI_0$, $RI_0$ is a critical risk value, in which case, a collision during lane changing will definitely happen; and when $R_l < RI_0$, lane changing can be made, in which case, a probability of the collision caused by lane changing is relatively low.

12. The vehicle-road collaborative lane-changing risk assessment method based on the coordinate transformation according to claim 1, wherein in the step S2, the two-dimensional coordinate system that takes the lane-changing vehicle $P_0$ as the center point is established, a true north is identified as a positive direction of a Y axis, a true east is identified as a positive direction of an X axis, which is consistent with a direction of Earth's spatial coordinate system.

* * * * *